US012534016B2

(12) United States Patent
Tsai et al.

(10) Patent No.: US 12,534,016 B2
(45) Date of Patent: Jan. 27, 2026

(54) SYSTEMS AND METHODS FOR GENERATING SOUND TOKENS

(71) Applicant: Toyota Connected North America, Inc., Plano, TX (US)

(72) Inventors: David Tsai, Irvine, CA (US); Will Hargis, Celina, TX (US); Charan S. Lota, Frisco, TX (US)

(73) Assignee: TOYOTA CONNECTED NORTH AMERICA, INC., Plano, TX (US)

( * ) Notice: Subject to any disclaimer, the term of this patent is extended or adjusted under 35 U.S.C. 154(b) by 570 days.

(21) Appl. No.: 18/065,317

(22) Filed: Dec. 13, 2022

(65) Prior Publication Data

US 2024/0190341 A1    Jun. 13, 2024

(51) Int. Cl.
*B60Q 5/00*     (2006.01)
*H04L 9/00*     (2022.01)
*H04L 9/32*     (2006.01)

(52) U.S. Cl.
CPC .............. *B60Q 5/00* (2013.01); *H04L 9/3213* (2013.01); *H04L 9/50* (2022.05); *H04L 2209/84* (2013.01)

(58) Field of Classification Search
CPC ........... B60Q 5/00; H04L 9/3213; H04L 9/50; H04L 2209/84; H04L 9/3239
See application file for complete search history.

(56) References Cited

U.S. PATENT DOCUMENTS

| | | | |
|---|---|---|---|
| 10,225,735 B2* | 3/2019 | Rivera | H04L 63/0823 |
| 12,003,642 B2* | 6/2024 | Mayne | H04L 9/0643 |
| 2009/0034750 A1* | 2/2009 | Ayoub | G10L 25/69 |
| | | | 704/E15.001 |
| 2022/0391899 A1* | 12/2022 | Lyren | H04L 9/3297 |
| 2023/0009304 A1* | 1/2023 | Jakobsson | G06Q 30/0241 |
| 2023/0354977 A1* | 11/2023 | Lin | A45C 15/00 |
| 2024/0070700 A1* | 2/2024 | Doumar | G06Q 10/107 |
| 2024/0144262 A1* | 5/2024 | Zhang | G06Q 20/3274 |
| 2024/0160400 A1* | 5/2024 | Kim | G06F 3/165 |

* cited by examiner

*Primary Examiner* — Oyesola C Ojo
(74) *Attorney, Agent, or Firm* — DINSMORE & SHOHL LLP

(57) ABSTRACT

Systems and methods for generating sound tokens, and methods for operating a vehicle are disclosed. In one embodiment, a method of generating a sound token includes recording a sound of an object, generating a sound profile of the object, and storing the sound profile as a non-fungible token on a blockchain.

13 Claims, 5 Drawing Sheets

SYSTEMS AND METHODS FOR GENERATING SOUND TOKENS

TECHNICAL FIELD

The present specification relates to sound profiles and, more particularly, to tokenized sound profiles provided on a blockchain.

BACKGROUND

Vehicles have a unique sound profile over a range of operating conditions. Some vehicles have a desirable sound profile that evoke emotion in people. For example, a particular sports car may have a unique engine rumble when idling and revving the engine to increase the revolutions per minute (RMP).

Other vehicles may have a quieter sound profile, such as economy vehicles and electric vehicles, which have no engine sound profiles. It may be desirable for a first vehicle (e.g., a quieter vehicle) to simulate a sound profile of a second vehicle (e.g., a louder vehicle).

SUMMARY

In one embodiment, a method of generating a sound token includes recording a sound of an object, generating a sound profile of the object, and storing the sound profile as a non-fungible token on a blockchain.

In another embodiment, a system for generating a sound token includes a microphone, one or more processors, and a non-transitory, computer-readable medium storing instructions that cause the one or more processors to record a sound of an object using the microphone, generate a sound profile of the object, and store the sound profile as a non-fungible token on a blockchain.

In yet another embodiment, a method of operating a vehicle includes receiving a request to load a sound profile stored by a non-fungible token, accessing the non-fungible token, and operating one or more speakers of the vehicle according to a sound profile associated with the non-fungible token.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
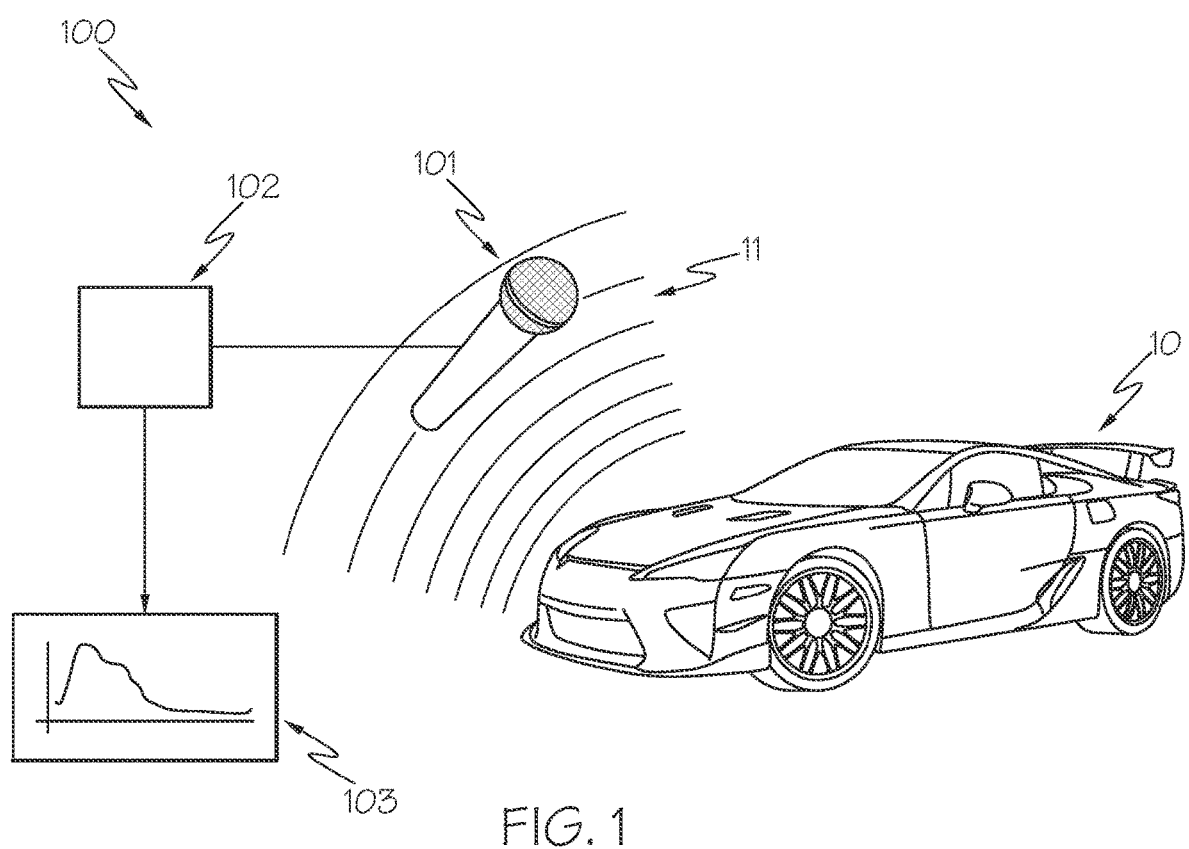
FIG. 1 illustrates an example system for generating a sound token according to one or more embodiments described and illustrated herein.

The embodiments disclosed herein describe systems and methods for generating sound profiles of objects that may be used in conjunction with one or more speakers to simulate a sound of the objects. As a non-limiting example, a sound profile of a sports car may be recorded and tokenized on a blockchain. The tokenized sound profile includes instructions for operating one or more speakers for replicating a sound of the sports car over a plurality of operating conditions, such as idling, revving the engine, accelerating from zero mph to sixty mph, and the like. An owner of the tokenized sound profile can then simulate the sound of the sports car using a speaker system, such as the speaker system of a second vehicle.

In one non-limiting example, when a vehicle comes off of the manufacturing line, a sound profile of the specific vehicle is recorded. For example, the specific vehicle may be Toyota Supra having a vehicle identification number (VIN). Thus, the sound profile that is recorded is specific to that particular Toyota Supra as identified by the VIN. The vehicle may be operated over a plurality of operating conditions, such as idling, revving the engine, accelerating, and the like. During the operation, the sound of the vehicle is recorded to produce the sound profile. The sound profile, which includes instructions regarding how to reproduce the sounds of the vehicle, may be tokenized and stored as a non-fungible token (NFT) on a blockchain, such as the Ethereum blockchain, for example. In this manner, the tokenized sound profile (also referred to herein as a sound token) is unique to the specific vehicle, such as the Toyota Supra. The tokenized sound profile may be provided to the purchaser of a vehicle, sold or traded, or subject to any other activity.

In one example an owner of a second vehicle may acquire the tokenized sound profile. The second vehicle may be configured to receive and verify the tokenized sound profile, as well as read the instructions to reproduce a sound of the recorded vehicle (e.g., the Toyota Supra discussed above) using the second vehicle's sound system. Thus, the second vehicle may sound like the recorded vehicle by way of the second vehicle's sound system, which may include interior and exterior speakers. The tokenized sound profile is such that the sound produced by the second vehicle's sound system matches the recorded vehicle's sound at different operating conditions. For example, when the second vehicle is idling, the sound emitted by the sound system sounds like the recorded vehicle when idling. When the second vehicle is revving the engine at different RPMs, the sound emitted by the sound system sounds like the recorded vehicle when revving the engine at the same RPMs.

In this manner, an owner of a tokenized sound profile may cause his or her vehicle to mimic the sound of a different vehicle.

Various embodiments of systems and methods for generating sound profiles and operating vehicles are described in detail below.

Figure 2:
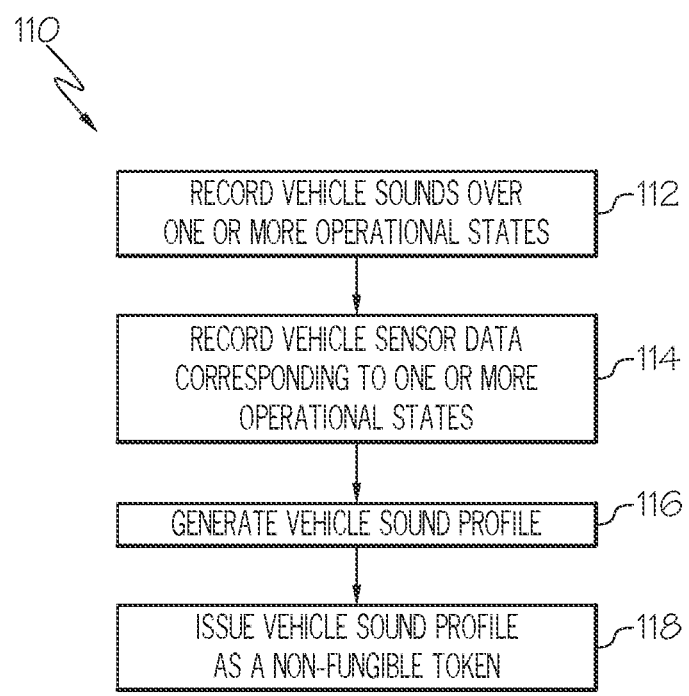
FIG. 2 illustrates a flowchart of an example method for generating a sound token according to one or more embodiments described and illustrated herein.

FIG. 1 illustrates a system 100 for generating a sound token storing a sound profile 103 of a recorded vehicle 10. FIG. 2 illustrates a method 110 for generating a sound token storing a sound profile 103 of the recorded vehicle 10 shown in FIG. 1. It is noted that, although embodiments are described in the context of generating sound tokens for vehicles, embodiments are not limited thereto. Embodiments described herein may be utilized to generate sound tokens for any object that emits a sound, such as, without limitation, watercraft, aircraft, heavy machinery, animals, and the like.

The object shown in FIG. 1 is a vehicle 10, which may be a sports car, for example. At block 112 of the flowchart of FIG. 1, the system 100 records the sounds made by the vehicle 10 during one or more operations to generate a sound profile 103. The system 100 includes one or more microphones 101 in which to capture sounds (illustrated by sound waves 11) made by the vehicle 10. Any number of microphones 101 may be utilized to capture the sounds of the vehicle 10. In some embodiments, an array of microphones 101 may be positioned around the vehicle 10 to capture the sounds of the vehicle 10 from many directions. As a non-limiting example, the vehicle 10 and an array of microphones 101 may be positioned in a sound recording booth. As another example, a rig (not shown) holding an array of microphones 101 may be attached to the vehicle 10 so that the array of microphones 101 are positioned around the vehicle 10 and can capture the sounds of the vehicle 10 as it is in motion (e.g., accelerating or driving at a constant speed). In other embodiments, only a single microphone 101 is used to record the sounds of the vehicle 10.

Data representing the sound that is captured by the one or more microphones 101 is provided to a computing device capable of recording the sound in digital format within a non-transitory computer-readable medium.

In some embodiments, sensor data of the vehicle 10 is also captured to correlate the operating state of the vehicle with the sound that it produces (block 114 of FIG. 2). Sensor data may be produced by sensors of the vehicle 10, such as, without limitation, a tachometer, a speedometer, an accelerometer, a gyroscope, a temperature sensor, a camera, a lidar sensor, a radar sensor, and the like. The sensor data provides vehicle and/or environmental information that can be correlated with the sound that the vehicle 10 makes. The vehicle 10 may make different sounds in different operating conditions. For example, the vehicle 10 may sound differently in relatively cold weather as compared to relatively warm weather.

The sensor data may also be stored by the sound token so that the sounds produced by a sound system of a second vehicle sounds as close as possible to the sound of the recorded vehicle 10 at similar operating conditions. Thus, the sound profile 103 may include information regarding the sounds of the vehicle 10 at a plurality of operating conditions. As a non-limiting example, when a user loads the sound token into his vehicle and revs the engine to 5,000 RMPs while stationary, the sound system of his vehicle will produce a sound similar to the recorded vehicle 10 when it is revved to 5,000 RMPs while stationary.

At block 116 of FIG. 2, a sound profile is generated, such as by the computing device 102. The sound profile 103 includes information regarding the sounds produced by the vehicle 10. As a non-limiting example, the sound profile 103 may include a spectral density over a range of wavelengths. The sound profile 103 may provide instructions regarding how to reproduce the recorded sound by way of one or more speakers. As a non-limiting example, the sound profile 103 may be configured as one or more sound files. Any known or yet-to-be-developed method of storing sound information for reproduction may be utilized. When sensor data is also captured, the sound profile 103 also include sensor data indicative of the operational state of the recorded vehicle 10. Thus, the sound profile 103 includes sound information over a plurality of operational states. In other embodiments, the sound profile 103 may not include sensor data and/or operational state data and thus only produce a sound at one operational state.

Next, at block 118, the sound profile is stored and issued as a token on a blockchain 150 (see FIG. 3), such as a NFT. The NFT provides a unique sound profile that is only accessible to the owner of the NFT. Thus, the NFT may have monetary value. As a non-limiting example, a sound profile NFT (also referred to herein as a sound token) of a famous vehicle (e.g., the winning vehicle of the 2021 Le Mans race) may be desirable and thus bought, sold and/or traded. As another example, a user may create a sound token of his or her own vehicle. As another example, a vehicle manufacturer may issue a limited number of sound profiles for a particular model and year of a vehicle (e.g., 1,000 sound tokens representing the sound profile of a 2022 Toyota Supra).

Figure 3:
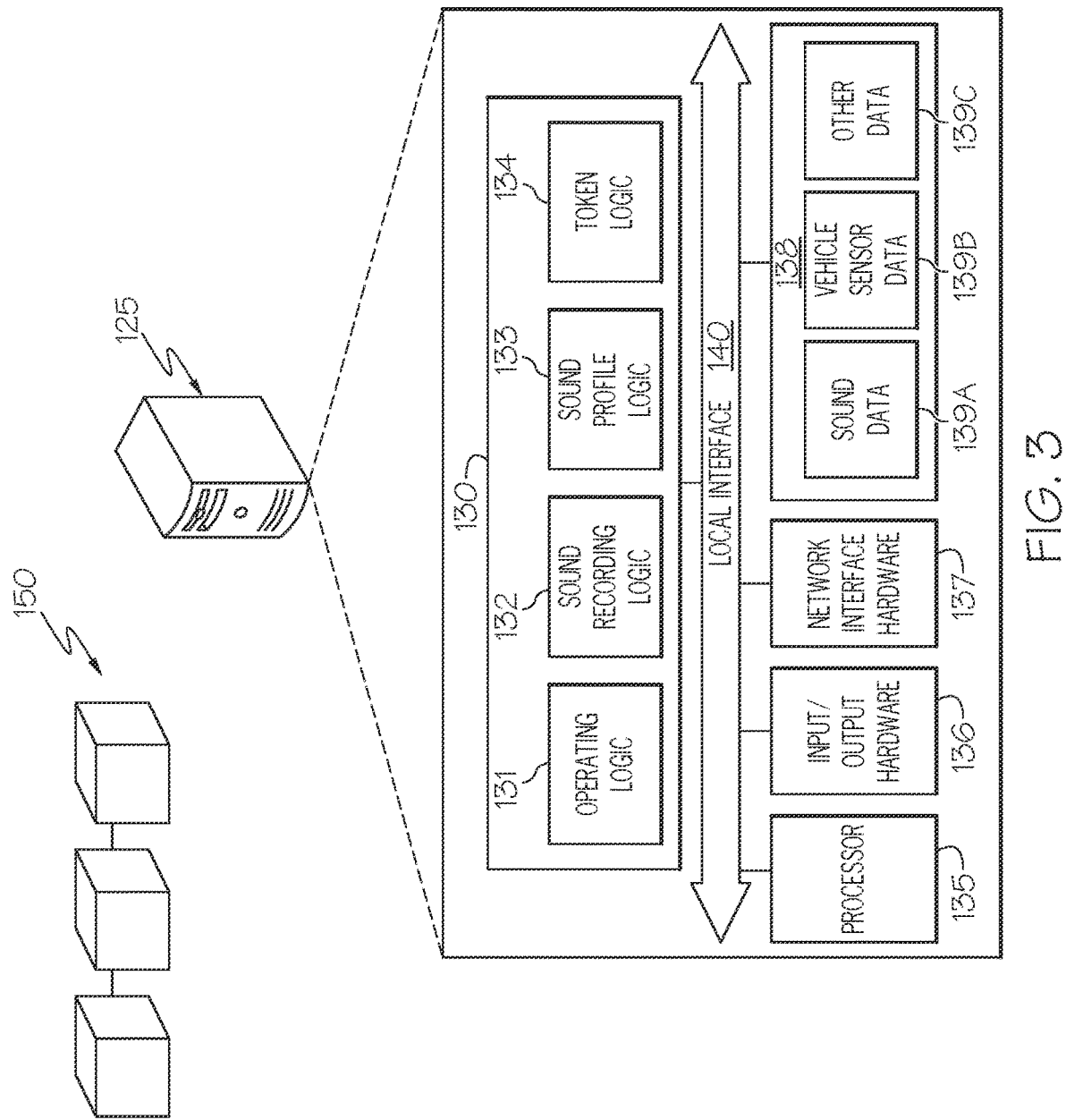
FIG. 3 illustrates an example computing system for generating a sound token according to one or more embodiments described and illustrated herein.

Embodiments of the present disclosure may be implemented by a computing device, and may be embodied as computer-readable instructions stored on a non-transitory memory device. Referring now to FIG. 3 an example system for generating sound tokens configured as a computing device 125 is schematically illustrated. The example computing device 125 provides a system for generating sound tokens, and/or a non-transitory computer usable medium having computer readable program code for generating sound tokens embodied as hardware, software, and/or firmware, according to embodiments shown and described herein. While in some embodiments, the computing device 125 may be configured as a general purpose computer with the requisite hardware, software, and/or firmware, in some embodiments, the computing device 125 may be configured as a special purpose computer designed specifically for performing the functionality described herein. It should be understood that the software, hardware, and/or firmware components depicted in FIG. 3 may also be provided in other computing devices external to the computing device 125 (e.g., data storage devices, remote server computing devices, and the like).

As also illustrated in FIG. 3, the computing device 125 (or other additional computing devices) may include a processor 135, input/output hardware 136, network interface hardware 137, a data storage component 138 (which may include sound data 139A (i.e., sound data recorded by the one or more microphones 101), vehicle sensor data 139B (i.e., any sensor data from the vehicle's sensors that are used to determine an operational state of the vehicle), and any other data 139C for performing the functionalities described herein), and a non-transitory memory component 130. The memory component 130 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components.

Additionally, the memory component 130 may be configured to store operating logic 131, sound recording logic 132 for receiving signals from one or more microphones and storing the signals as a digital representation of sound, sound profile logic 133 for generating a sound profile from sounds recorded by the one or more microphones, and token logic 134 for converting a sound profile into a token for recording on a blockchain, such as a NFT, as described herein (each of which may be embodied as computer readable program code, firmware, or hardware, as an example). It should be understood that the data storage component 138 may reside local to and/or remote from the computing device 125, and may be configured to store one or more pieces of data for access by the computing device 125 and/or other components.

A local interface 150 is also included in FIG. 3 and may be implemented as a bus or other interface to facilitate communication among the components of the computing device 125.

The processor 135 may include any processing component configured to receive and execute computer readable code instructions (such as from the data storage component 138 and/or memory component 130). The input/output hardware 136 may include a graphics display device, keyboard, mouse, printer, camera, microphone, speaker, touch-screen, and/or other device for receiving, sending, and/or presenting data. The network interface hardware 147 may include any wired or wireless networking hardware, such as a modem, LAN port, wireless fidelity (Wi-Fi) card, WiMax card, mobile communications hardware, and/or other hardware for communicating with other networks and/or devices.

Included in the memory component 130 may be the store operating logic 131, sound recording logic 132, sound profile logic 133, and token logic 134. The operating logic 131 may include an operating system and/or other software for managing components of the computing device 125. The operating logic 131 may also include computer readable program code for displaying the graphical user interface used by the user to input design parameters and review reports. Similarly, the sound recording logic 132 may reside in the memory component 130 and may be configured to convert sound signals into digital signals for further processing. The sound profile logic 133 also may reside in the memory component 130 and may be configured to generate one or more sound profiles from the digital sound signals recorded by the sound recording logic, as well as from any sensor data from a vehicle. The token logic 134 includes logic to tokenize the one or more sound profiles. Any known or yet-to-be-developed logic for tokenizing the one or more sound profiles and storing the resulting sound token on a blockchain may be utilized.

The components illustrated in FIG. 3 are merely exemplary and are not intended to limit the scope of this disclosure. More specifically, while the components in FIG. 3 are illustrated as residing within the computing device 125, this is a non-limiting example. In some embodiments, one or more of the components may reside external to the computing device 125.

Figure 4:
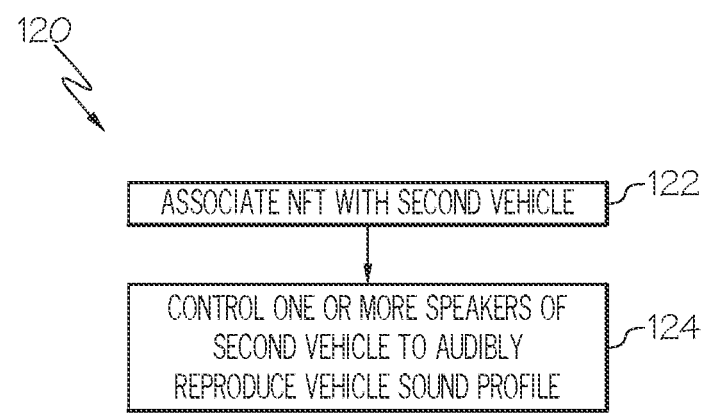
FIG. 4 illustrates a flowchart of an example method for operating a vehicle using a sound token according to one or more embodiments described and illustrated herein.
Figure 5:
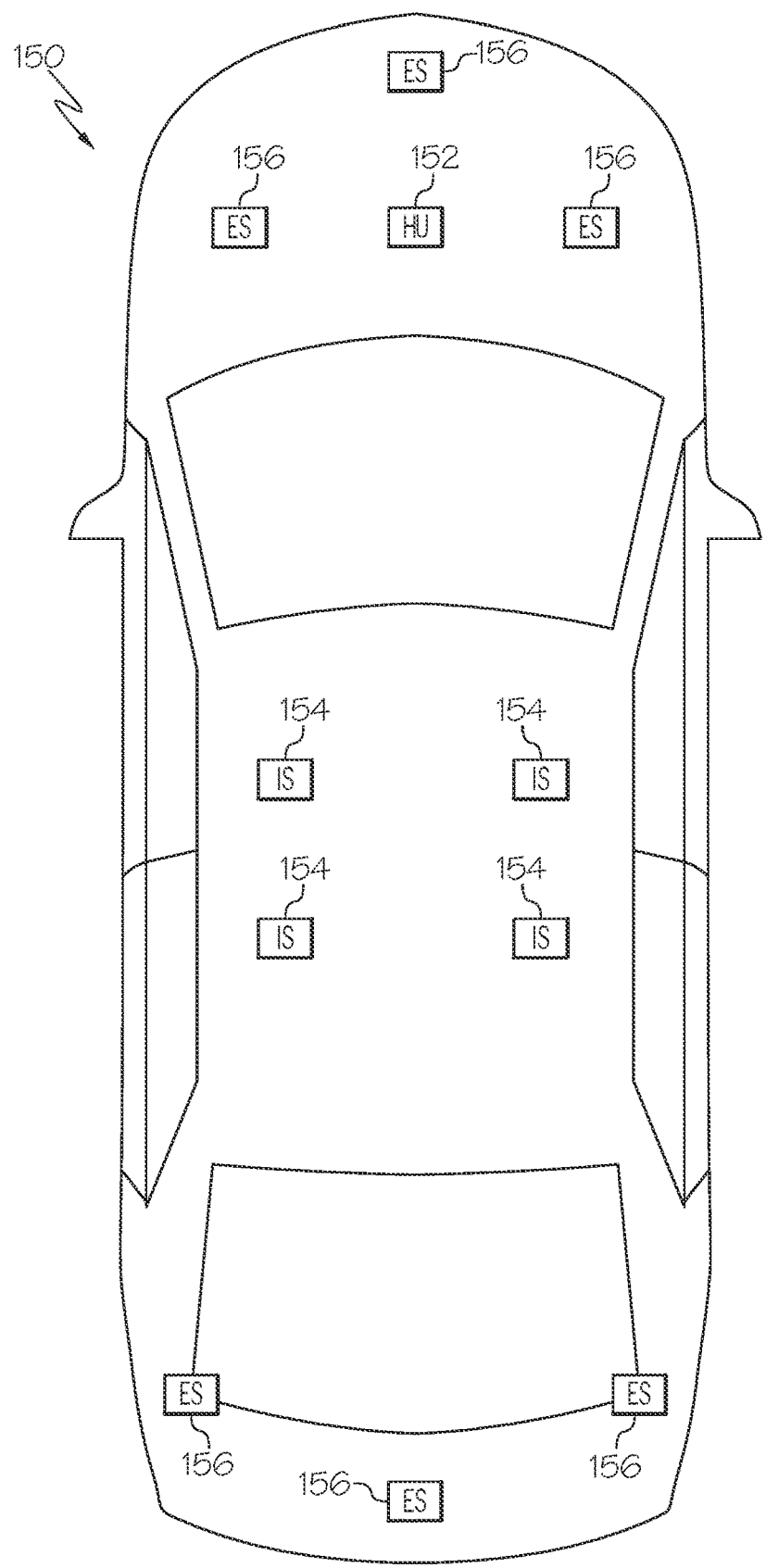
FIG. 5 illustrates an example vehicle for producing sounds according to a sound token to mimic the sounds of a recorded vehicle according to one or more embodiments described and illustrated herein.

As stated above, an owner of a sound token may use the sound token to reproduce the sound of the recorded object using one or more speakers. FIG. 4 is a flowchart 120 illustrating an example method of using a sound token to produce sounds of a recorded vehicle. FIG. 5 is a non-limiting example vehicle 150 capable of playing the sounds of a sound token storing information relating to a recorded vehicle. The example vehicle 150 includes a head unit 152, which may be the head unit of a vehicle infotainment system, for example. The head unit 152 may include a user input device, such as a touch screen or buttons, to receive input from a user. In one example, the head unit 152 may display a user interface to enter information regarding a sound token. As a non-limiting example, the head unit 152 may display a digital wallet that includes one or more sound tokens that are owned by the user. The user may add sound tokens to the digital wallet by way of the head unit 152, and/or may add sound tokens by a mobile application or website. All of the sound token owned by the user may be visible in the digital wallet that is displayed by the head unit 152.

At block 122 of FIG. 4, a sound token (i.e., an NFT) is associated with a second vehicle (i.e., a vehicle other than the recorded vehicle). The association of the sound token with a second vehicle may be done in a variety of ways. The user may select a sound token shown on the head unit 152. In another example, a mobile device application operating on the user's mobile device may be used to select a sound token.

After selection of the sound token, the second vehicle 150 may then audibly reproduce the vehicle sound profile associated with the sound token using one or more speakers. Thus, the second vehicle may use the sound token to mimic the sounds of the recorded vehicle 10.

FIG. 5 illustrates a second vehicle 150 having a plurality of speakers in the form of internal speakers 154 that produce sounds within the cabin of the second vehicle 150, as well as exterior speakers 156 that produce sounds that are emitted to the environment of the second vehicle 150. It should be understood that in other embodiments, no exterior speakers 156 are provided, or only one exterior speaker 156 is provided. As one example, the second vehicle 150 may be an electric vehicle having at least one exterior speaker 156 that is provided to produce a sound when the second vehicle 150 is traveling at a speed lower than a speed threshold to make others aware of the second vehicle 150. When more than one external speaker 156 is provided, and multiple microphones 101 were used to record the sound profile associated with the sound token, the multiple external speakers 156 may be used to provide directional sound in a manner similar to the recorded vehicle 10. For example, a left speaker of the second vehicle may produce a sound corresponding to a channel of the sound profile corresponding to a microphone 101 on the left side of the recorded vehicle 10.

In some embodiments, one or more of the exterior speakers 156 (and/or the interior speakers 152) are low frequency transducers capable of producing sound waves that are not audible to the human ear but can be felt by the human body. These low frequency transducers may recreate the "rumble" that can be felt by certain engines.

In some embodiments, the instructions of the sound token are such that the operational state of the second vehicle 150 is determined based on sensor data, and sounds are produces by the plurality of speakers 152, 156 in accordance with the sounds produced by the recorded vehicle 10 at the same operational state. For example, when the second vehicle 150 is accelerating from zero mph to sixty mph, the plurality of speakers 152, 156 produce sounds that mimic the sounds produced by the recorded vehicle 10 when it accelerates from zero to sixty mph. Thus, the sound tokens of the present disclosure enable users to apply a "sound costume" to their vehicles that mimic other vehicles.

Information stored within the sound token may be accessed by a software program that is executed by the second vehicle 150, such as executed by a processor associated with the infotainment system. Additionally, sensor data of the second vehicle 150 may also be read by the software program, such as by monitoring a CAN bus. The software program may determine the operational state of the second vehicle 150, look up the sound profile associated with the operation state of the recorded vehicle 10, and produce signals for the plurality of speakers 152, 156 to produce the sound profile at the determined operational state.

It should now be understood that embodiments of the present disclosure are directed to sound tokens, such as sound NFTs, that store sound profiles that include information about sounds produced by an object. A sound token may represent the sound of a particular vehicle at a plurality of operational states of the vehicle. When accessed, the sound token may be used to produce sounds corresponding to the sound profile by one or more speakers. Thus, owners of sound tokens may use the sound tokens to make their vehicles sound like other vehicles.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method of generating a sound token comprising:
    recording a sound of an object a vehicle;
    recording sensor data of the vehicle over a plurality of operating conditions of the vehicle, wherein the plurality of operating conditions comprises one or more of vehicle velocity, vehicle acceleration, and engine revolutions per minute;
    generating a sound profile of the vehicle, wherein the sound profile is based at least in part on the recording of the sound of the vehicle over the plurality of operating conditions and the sensor data of the vehicle over the plurality of operating conditions; and
    storing the sound profile as a non-fungible token on a blockchain.

2. The method of claim 1, wherein the vehicle is associated with a vehicle identification number such that the sound profile of the non-fungible token represents the sound of the vehicle associated with the vehicle identification number.

3. The method of claim 1, wherein the sound profile is such that an individual sound of the vehicle corresponds to an individual operating condition of the vehicle based on the sensor data.

4. A system for generating a sound token, the system comprising:
    a microphone;
    one or more processors;
    a non-transitory, computer-readable medium storing instructions that cause the one or more processors to:
    record a sound of a vehicle using the microphone;
    receive and record sensor data of the vehicle over a plurality of operating conditions of the vehicle, wherein the plurality of operating conditions comprises one or more of vehicle velocity, vehicle acceleration, and engine revolutions per minute;
    generate a sound profile of the vehicle object, wherein the sound profile is based at least in part on the recording of the sound of the vehicle over the plurality of operating conditions and the sensor data of the vehicle over the plurality of operating conditions; and
    store the sound profile as a non-fungible token on a blockchain.

5. The system of claim 4, wherein the vehicle is associated with a vehicle identification number such that the sound profile of the non-fungible token represents the sound of the vehicle associated with the vehicle identification number.

6. The system of claim 4, wherein the sound profile is such that an individual sound of the vehicle corresponds to an individual operating condition of the vehicle based on the sensor data.

7. A method of operating a vehicle comprising:
    receiving a request to load a sound profile stored by a non-fungible token;
    accessing the non-fungible token;
    receiving vehicle sensor data as the vehicle is operated according to one or more operating conditions, wherein:
    the sound profile comprises sounds recorded over a plurality of recorded operating conditions, the plurality of recorded operating conditions comprises one or more of vehicle velocity, vehicle acceleration, and engine revolutions per minute;
    the method further comprises matching a current operating condition of the vehicle with a matching recorded operating condition based on the vehicle sensor data; and
    operating one or more speakers of the vehicle according to a sound profile associated with the non-fungible token;
    the operating of the one or more speakers of the vehicle according to the sound profile comprises operating the one or more speakers of the vehicle according to the matching recorded operating condition.

8. The method of claim 7, wherein the vehicle is associated with a vehicle identification number such that the sound profile of the non-fungible token represents a sound of the vehicle associated with the vehicle identification number.

9. The method of claim 7, wherein the one or more speakers of the vehicle comprise one or more exterior speakers.

10. The method of claim 7, wherein the request to load the sound profile is received from a head unit of the vehicle.

11. The method of claim 1, further comprising transferring the non-fungible token to another user on the blockchain.

12. The system of claim 4, wherein the instructions further cause a transfer of the non-fungible token to another user on the blockchain.

13. The method of claim 7, wherein the non-fungible token is one of a plurality of non-fungible tokens available to a user.

* * * * *